(12) United States Patent
Mancuso

(10) Patent No.: US 7,177,856 B1
(45) Date of Patent: Feb. 13, 2007

(54) METHOD FOR CORRELATING DATA FROM EXTERNAL DATABASES

(75) Inventor: Patrick Mancuso, Center Tuftonboro, NH (US)

(73) Assignee: International Business Machines Corporation, Armonk, NY (US)

( * ) Notice: Subject to any disclaimer, the term of this patent is extended or adjusted under 35 U.S.C. 154(b) by 754 days.

(21) Appl. No.: 09/969,956

(22) Filed: Oct. 3, 2001

(51) Int. Cl.
*G06G 17/30* (2006.01)
(52) U.S. Cl. .................................. 707/3; 707/10; 707/2
(58) Field of Classification Search ................ 707/4, 707/5, 7, 3, 2, 10, 100, 104.1
See application file for complete search history.

(56) References Cited

U.S. PATENT DOCUMENTS

| | | | |
|---|---|---|---|
| 5,201,046 A | | 4/1993 | Goldberg et al. |
| 5,237,661 A | * | 8/1993 | Kawamura et al. ............ 707/1 |
| 5,524,202 A | * | 6/1996 | Yokohama ............... 707/104.1 |
| 5,615,361 A | | 3/1997 | Leung et al. |
| 5,799,210 A | * | 8/1998 | Cohen et al. .................. 707/7 |
| 5,806,079 A | | 9/1998 | Rivette et al. |
| 5,822,750 A | | 10/1998 | Jou et al. |
| 5,870,747 A | | 2/1999 | Sundaresan |
| 5,899,986 A | | 5/1999 | Ziauddin |
| 5,913,061 A | | 6/1999 | Gupta et al. |
| 5,931,900 A | | 8/1999 | Notani et al. |
| 5,940,819 A | | 8/1999 | Beavin et al. |
| 5,960,200 A | | 9/1999 | Eager et al. |
| 5,995,957 A | | 11/1999 | Beavin et al. |
| 6,003,065 A | | 12/1999 | Yan et al. |
| 6,006,214 A | | 12/1999 | Carey et al. |
| 6,012,067 A | * | 1/2000 | Sarkar ..................... 707/103 R |
| 6,078,924 A | | 6/2000 | Ainsbury et al. |
| 6,078,926 A | | 6/2000 | Jensen et al. |
| 6,091,412 A | | 7/2000 | Simonoff et al. |
| 6,108,671 A | * | 8/2000 | Ogawa ....................... 707/204 |
| 6,122,639 A | | 9/2000 | Babu et al. |
| 6,381,601 B1 | * | 4/2002 | Fujiwara et al. ............... 707/7 |
| 6,519,612 B1 | * | 2/2003 | Howard et al. ............. 707/200 |
| 6,651,140 B1 | * | 11/2003 | Kumar ....................... 711/118 |
| 2001/0004737 A1 | * | 6/2001 | Laux ............................ 707/1 |

OTHER PUBLICATIONS

Gavrielides et al. Color-based descriptions for image fingerprinting, Multimedia, IEEE transactions, Aug. 2006, vol. 8, Issue. 4, pp. 740-748.*
Cheriton et al. Logged virtual memory, ACM Symposium on Operating System Principles, 1995, pp. 26-38.*
US 6,021,479, 02/2000, Stevens (withdrawn)

* cited by examiner

*Primary Examiner*—Jean M. Corrielus
*Assistant Examiner*—Baoquoc N. To
(74) *Attorney, Agent, or Firm*—Dreier LLP

(57) ABSTRACT

The present invention provides methods and systems by for identifying, from within a host operating environment, related data from two or more data sources, one or more of which data sources being an external data source to a host operating environment, and for assembling a result data group derived from the related data. The result data group may be assembled as a virtual native document within the host operating environment, such that data from the data group may be accessed and manipulated as a first class participant through the host operating environment by client computers, without requiring nonvolatile storage of external data as native data to the host operating environment.

24 Claims, 5 Drawing Sheets

METHOD FOR CORRELATING DATA FROM EXTERNAL DATABASES

CROSS-REFERENCE TO RELATED APPLICATIONS

This application is related to U.S. application Ser. No. 09/877,609, filed Jun. 8, 2001, and entitled, "METHOD FOR PROCESSING EXTERNAL DATA FOR ACCESS AND MANIPULATION THROUGH A HOST OPERATING ENVIRONMENT," which is hereby incorporated herein by reference in its entirety, and to U.S. application Ser. No. 09/877,513, filed Jun. 8, 2001, and entitled, "VIRTUALIZING EXTERNAL DATA AS NATIVE DATA," which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

This invention relates in general to networked computer systems, and in particular to methods and systems for associating data from one or more sources that are external to a host operating environment with related data from one or more other sources.

In a typical modern computing environment, client computers have access through a network to a server computer or server computers which provide the users of the client computers with an operating environment, or host operating environment, through which the users can utilize one or more applications, including, for example, database applications, communications packages, graphics applications management tools, security-related applications, word processing applications, spreadsheet applications, intranet and/or Internet applications, various messaging applications, etc. The term "host operating environment" is here used broadly to include the computing environment provided by a server computer or server computers to one or more client computers, allowing one or more client computers access to and interface with various software, telecommunications methods, etc. provided by or facilitated by the server computer or server computers.

Data is of course frequently utilized by being accessed and manipulated by client computers through the host operating environment. Data storage is typically provided such that the data can be accessed and utilized by the applications of the host operating environment, e.g., integrated with the host environment, without the need to use emulator software or other programs, such as linking programs or utilities, to provide a translation or link between the host operating system and the data source. Data accessible by a host operating system in the foregoing way is herein termed "native" to the host operating system.

In addition to native data, it is often desired to access or manipulate data from one or more non-native, e.g., external sources having external data, either separately from or together with native data. Such external data is generally not integrated for use in the host operating environment. A group of data sources, each of which is not integrated for use in one or more applications for which at least one of the other data sources is integrated for use with, are referred to herein as a heterogeneous group.

Data from a first external data table may be different in many respects than data from a native data table or tables, or different than data from another external data table or tables from a different external source or sources, including being formatted differently, stored differently, organized differently, coded differently, represented differently, etc. Nonetheless, data from a first external data table may relate to data from another external data table from a different external data source, and/or to data from one or more native data tables. For example, the information represented by the data in the first external data table may relate logically to the information represented in another external table in a different external data source, and/or to data from one or more native data tables. For example, each or several of the aforementioned tables may contain information about employees at a certain company; one table, table X, may contain the social security number of each of several employees of a Company A, another table, table Y, may contain the current addresses of several employees of Company A, the social security numbers of some of whom are contained in Table A. Even though related data may be stored in various sources including external sources, it is useful to be able to organize or assemble related data coherently, in spite of the disparate sources. For example, it is useful to be able to access and/or manipulate related data from a host operating environment, even though the related data is stored in disparate sources, including external sources. Such access and/or manipulation may be made possible, more convenient, and/or more efficient if the related data can be assembled in a coherent grouping.

Therefore, there is a need for methods and systems for identifying, from within a host operating environment, related data from two or more data sources, one or more of which data sources is an external data source to the host operating environment, and for assembling a data group derived from the related data.

SUMMARY OF THE INVENTION

The present invention provides methods and systems for identifying, from within a host operating environment, related data from two or more data sources, one or more of which data sources is an external data source to a host operating environment.

The present invention further provides methods and systems for identifying, from within a host operating environment, related data from two or more data sources, one or more of which data sources is an external data source to the host operating environment, and for assembling a data group derived from the related data.

The present invention further provides methods and systems for identifying, from within a host operating environment, related data from two or more data sources, one or more of which data sources is an external data source to the host operating environment, and for assembling a data group derived from the related data, such that data from the data group can be accessed and manipulated as a first class participant within the host operating environment without requiring non-volatile storage of external data as native data to the host operating environment.

In one embodiment, the invention provides a computer usable medium storing program code which, when executed on a computerized device, causes the computerized device to execute a method for assembling, from within a host operating environment, a result data group derived from related data from two or more data sources, one or more of the two or more data sources being an external data source to the host operating environment. The method includes: providing a connection between the host operating environment and the one or more external data sources through which external data is made available within the host operating environment; identifying one or more indexing data categories for determining relationship between data from each of the two or more data sources, each of the one or more indexing data categories being utilized in at least two of the two or more data sources to categorize data; utilizing data from at least two of the two or more data sources and categorized under at least one of the one or more indexing data categories, identifying related data from at least two of the two or more data sources; and, utilizing the related data, assembling the result data group derived from the related data.

In another embodiment, the invention provides a method for identifying, from within a host operating environment, related data from two or more data sources, one or more of the two or more data sources being an external data source to the host operating environment. The method includes: providing a connection between the host operating environment and each of the one or more external data sources though which external data is made available within the host operating environment; identifying one or more indexing data categories for determining relationship between data from each of the two or more data sources, each of the one or more indexing data categories being utilized in at least two of the two or more data sources to categorize data; and, utilizing data from at least two of the two or more data sources and categorized under at least one of the one or more indexing data categories, identifying related data from at least two of the two or more data sources.

In another embodiment, the invention provides a method for assembling, from within a host operating environment, a virtual native result document within the host operating environment derived from related data from two or more data sources, one or more of the two or more data sources being an external data source to the host operating environment. The method includes: providing a connection between the host operating environment and the one or more external data sources, through which external data is made available within the host operating environment; identifying one or more indexing data categories for determining relationship between data from each of the two or more data sources, each of the one or more indexing data categories being utilized in at least two of the two or more data sources to categorize data; utilizing data from at least two of the two or more data sources and categorized under at least one of the one or more indexing data categories, identifying related data from at least two of the two or more data sources; and, utilizing the related data, assembling the virtual result document derived from the related data, wherein one or more client computers may access and manipulate data from the virtual native result document as first class data through the host operating environment without requiring nonvolatile storage of external data as native data to the host operating environment.

In another embodiment, the invention provides a method for assembling, from within a host operating environment, a result data group derived from related data from two or more data sources, at least one of the two or more data sources being an external data source to the host operating environment. The method includes: providing a connection between the host operating environment and the one or more external data sources, through which external data is made available within the host operating environment; identifying one or more indexing data categories for determining relationship between data from each of the two or more data sources, each of the one or more indexing data categories being utilized in at least two of the two or more data sources to categorize data; utilizing data from at least two of the two or more data sources and categorized under at least one of the one or more indexing data categories, identifying related data from at least two of the two or more data sources; and, utilizing the related data, assembling the result data group derived from the related data.

In another embodiment, the invention provides a system for assembling, from within a host operating environment, a result data group derived from related data from two or more data sources, at least one of the two or more data sources being an external data source to the host operating environment. The system includes: a server computer which facilitates providing the host operating environment; at least one data source that is external to the host operating environment; a connection program, capable of being executed within the host operating environment, for providing a connection between the host operating environment and the at least one external data source, through which connection external data is made available within the host operating environment; and a relate program, capable of being executed within the host operating environment. The relate program is for: identifying one or more indexing data categories for determining relationship between data from each of the two or more data sources, each of the one or more indexing data categories being utilized in at least two of the two or more data sources to categorize data; utilizing data from at least two of the two or more data sources and categorized under at least one of the one or more indexing data categories, identifying related data from at least two of the two or more data sources; and, utilizing the related data, assembling the result data group derived from the related data.

In another embodiment, the invention provides a system for assembling, from within a host operating environment, a result data group derived from related data from two or more data sources, at least one of the two or more data sources being an external data source to the host operating environment. The system includes: means for providing a connection between the host operating environment and each of the one or more external data sources, though which external data is made available within the host operating environment; means for identifying one or more indexing data categories for determining relationship between data from each of the two or more data sources, each of the one or more indexing data categories being utilized in at least two of the two or more data sources to categorize data; means for utilizing data from at least two of the two or more data sources and categorized under at least one of the one or more indexing data categories, identifying related data from at least two of the two or more data sources; and means for, utilizing the related data, assembling the result data group derived from the related data.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENT

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

The present invention provides methods and systems for identifying, from within a host operating environment, related data from two or more data sources, one or more of which data sources is an external data source to a host operating environment. In some embodiments, the invention provides methods and systems for identifying, from within a host operating environment, related data from two or more data sources, one or more of which data sources is an external data source to the host operating environment, and for assembling a data group derived from the related data, such that data from the data group can be accessed and manipulated from within the host operating environment without requiring non-volatile storage of external data as native data to the host operating environment.

The term "program" as used herein is intended to broadly interpreted, and may include, for example, manipulation of the host operating environment or applications therein, such as by utilizing application programming interface (API) tools or other tools, as well as programs entirely introduced into the host operating environment.

Figure 1:
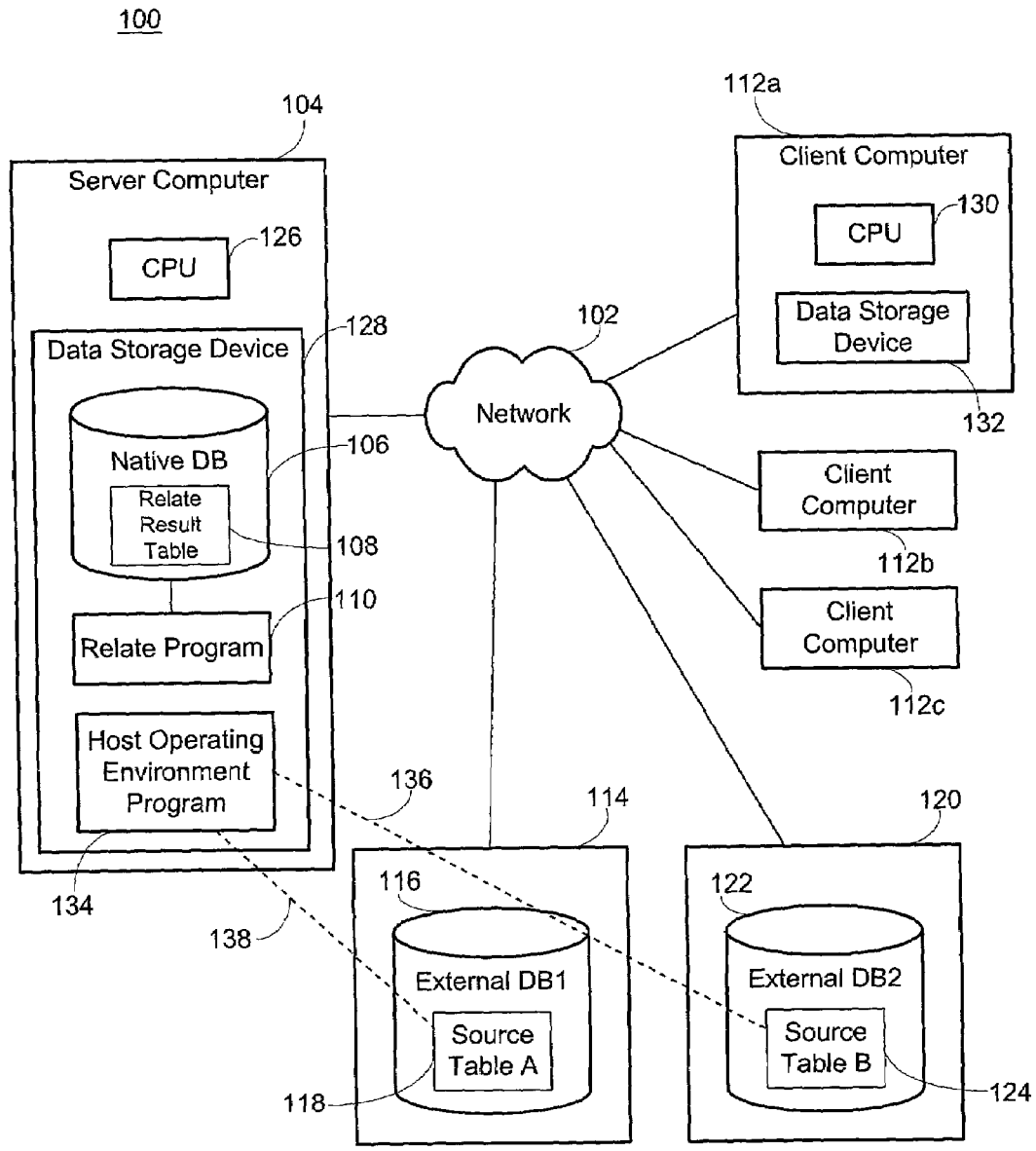
FIG. 1 is a block diagram depicting a distributed computer system incorporating a relate program and a relate result table, according to one embodiment of the invention.

FIG. 1 is a block diagram of a distributed computer system 100 according to one embodiment of the invention, incorporating a relate program 110 and a relate result table 108. In the computer system 100 depicted in FIG. 1, a server computer 104 is connected to one or more external data sources 114, 120 (two are shown), such as heterogeneous external data sources, and one or more client computers 112a–c (three are shown) via a network 102. The external data sources 114, 120 can be, for instance, a data storage device within a relational database management system, and can be Open DataBase Compliant (ODBC) data sources. Although only one server computer 104 is shown, the invention also contemplates embodiments wherein multiple server computers are included. The network 102 depicted can broadly include an array of networks, which can include one or more local area networks, one or more wide area networks, and may also include a connection to the Internet, although embodiments of the invention are contemplated in which no connection to the Internet is provided.

Each client computer 112a–c comprises one or more Central Processing Units (CPUs) 130, and one or more data storage devices 132, which may include one or more Internet browser programs. The external data source 114 comprises an external database 116 which comprises a source table A 118. The external data source 120 comprises an external database 122 which comprises a source table B 118. The server computer 104 comprises one or more CPUs 126 and one or more data storage devices 128.

The data storage device 134 of the server computer 104 and the data storage devices of the client computers 112a–c, as well as the external data sources 114, 120, may comprise various amounts of RAM for storing computer programs and other data. In addition, both the server computer 104 and the client computers 112a–c may include other components typically found in computers, including one or more output devices such as monitors, other fixed or removable data storage devices such as hard disks, floppy disk drives and CD-ROM drives, and one or more input devices, such as mouse pointing devices and keyboards.

Generally, both the server computer 104 and the client computers 112a–c operate under and execute programs under the control of an operating system, such as Windows, Macintosh, UNIX, etc. In the embodiment shown, the host operating environment program 134 is stored and executed from the server computer 104, although in other embodiments the host operating environment program 134 could be stored and executed from one of the client computers 112a–c or elsewhere. The host operating environment program 134 is intended to be broadly interpreted as a composite, and may include and provide numerous applications that are part of the host operating environment extended to the client computers 112a–c.

Generally, the computer programs of the present invention are tangibly embodied in a computer-readable medium, e.g., one or more data storage devices attached to a computer. Under the control of an operating system, computer programs may be loaded from data storage devices into computer RAM for subsequent execution by the CPU. The computer programs comprise instructions which, when read and executed by the computer, cause the computer to perform the steps necessary to execute elements of the present invention.

In the embodiment shown, the data storage device 128 of the server computer 104 comprises a host operating environment program 134, a native database 106, a relate result table 108, and a relate program 110. The relate program 110 is depicted within the server computer 104, but could be stored and/or executed elsewhere. Through execution of the relate program, related data from Table A 118 and Table B 124 is identified and utilized to derive a data group, such as the relate result table 108 shown. Although the relate result table 108 is shown, various other types of data groups reflecting any type of organization of data are possible. Additionally, although the external data sources 114, 120 are depicted as containing databases 116, 122 containing source tables 118, 124, the invention contemplates any type of external data source, data containers, and/or data organizational structures.

Broken lines 136 and 138 are intended to convey that a host operating environment (shown in FIG. 2) provided by the host operating environment program 134 is connected to the external databases 114, 120, so that external data may be accessed through the host operating environment 134. U.S. Pat. No. 6,003,025, issued Dec. 14, 1999, and entitled, "DATA TRANSFORMER SYSTEM FOR ACCESSING DATABASE INFORMATION," which is hereby incorporated herein by reference in its entirety, discloses systems by which data from disparate data sources can be utilized, which systems can be utilized in some embodiments of the present invention to provide a connection between a host operating environment and one or more external data sources.

The relate result table may contain data included in Table A 118 or Table B 124, or, in some embodiments, may contain data derived in any way from data in Table A 118 or Table B 124. For example, if the related data is numerical, the relate program 110 could direct that the relate result table 108 contain the results of related data after the related data has been mathematically manipulated or operated on. If data stored in the relate result table 108 is changed by the client computers 112a–c or in some other fashion, such changes may or may not be reflected by updating the related data in Tables A 118 and Table B 124 appropriately.

In some embodiments of the invention, the client computers 112a–c access and manipulate external data utilizing the relate result table 108. The relate result table 108 is shown within the native database 106, but, in some embodiments of the invention, the relate result table 108 is a "virtual" native document to the host operating environment, so that neither any relate table, nor any, or any other, external data must be stored non-volatilely in the host operating environment in order to enable access and manipulation of external data by the client computers 112a–c. In such embodiments, the virtual native document may function as a vehicle to allow access and manipulation of external data through the host operating environment.

Previously incorporated by reference U.S. application Ser. No. 09/877,609, entitled, "METHOD FOR PROCESSING EXTERNAL DATA FOR ACCESS AND MANIPULATION THROUGH A HOST OPERATING ENVIRONMENT" discloses methods by which client computers can access and manipulate external data as a first class, or full, participant in a host operating environment. The methods described in U.S. application Ser. No. 09/877,609 provide the advantage of not requiring that external data be stored non-volatilely as native data in the host operating environment, which provides efficiency and data integrity advantages. Previously incorporated by reference U.S. application Ser. No. 09/877,513, entitled, "VIRTUALIZING EXTERNAL DATA AS NATIVE DATA", describes in detail certain methods by which external data can be "virtualized" as native data. The methods described in application Ser. Nos. 09/877,609 and 09/877,513 can be utilized to advantage in some embodiments of the present invention, both to provide a connection between the host operating environment and the external data sources 114, 120, and also to allow access and manipulation of data from the external data sources 114, 120 as a first class participant in the host operating environment, without requiring non-volatile storage of external data as native data to the host operating environment.

For example, the relate result table 108 can be a virtual document, as described in detail in application Ser. Nos. 09/877,609 and 09/877,513, which virtual document can allow access and manipulation of external data represented in the relate result table.

Figure 2:
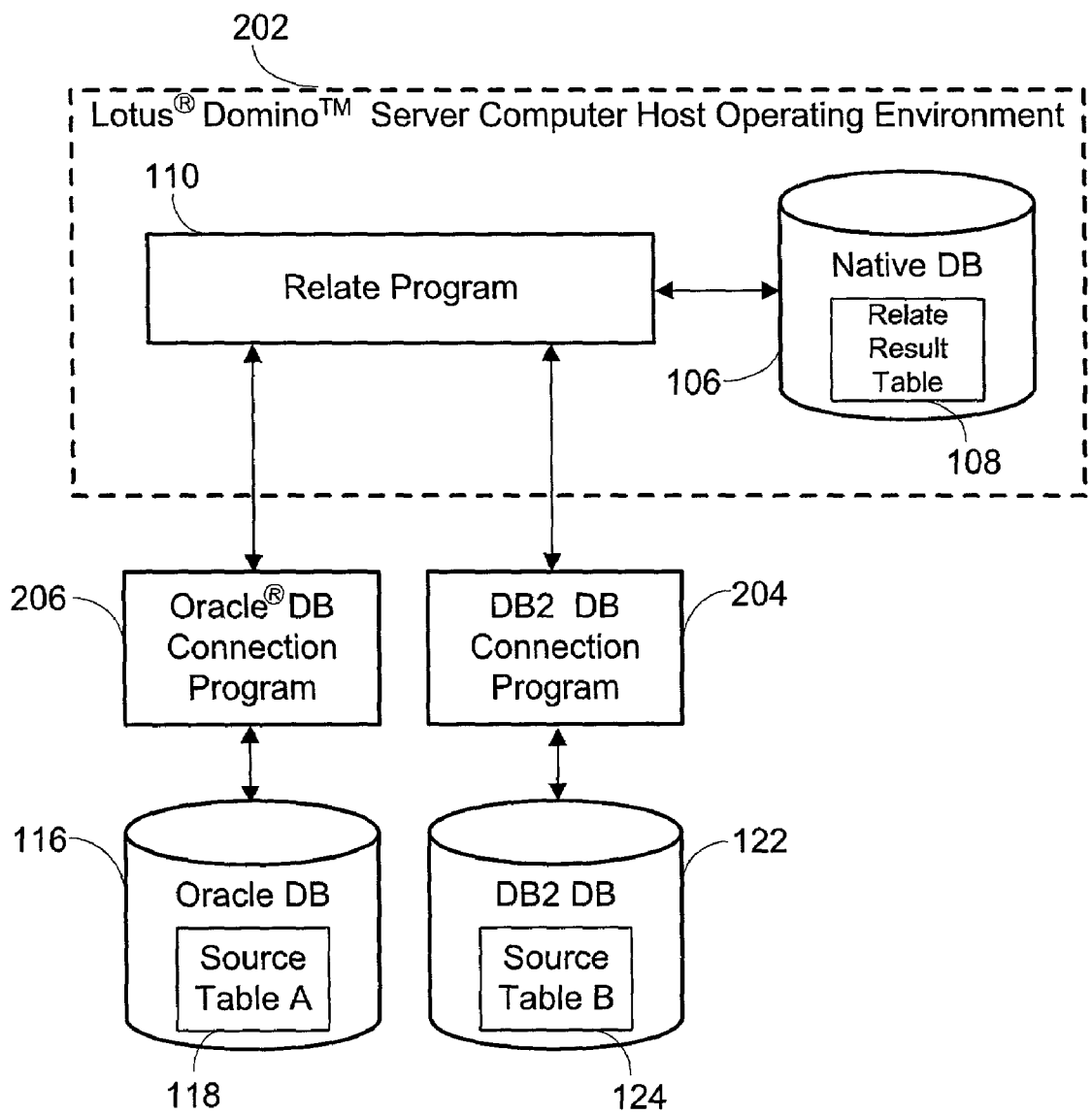
FIG. 2 is a block diagram depicting one embodiment of the distributed computer system of FIG. 1, including a relate program and a relate result table within a host operating environment.

FIG. 2 is a block diagram depicting a system 200 which represents one embodiment of the distributed computer system 100 of FIG. 1, including one embodiment of the relate program 110 and one embodiment of the relate result table 108 within a host operating environment 202 conceptually represented by a broken rectangle. As shown, the host operating environment 202 is one provided by a Lotus® Domino™ server computer, commercially available from International Business Machines Corporation (IBM®). The Lotus® Domino™ server computer is one example of a server computer 104 as depicted in FIG. 1. As shown in FIG. 2, external database one 116 is from an Oracle® relational database system, commercially available from Oracle® Corporation, and external database two 122 is from a commercially available DB2 database. Other examples of an external data sources that can be used with the present invention include Sybase® databases, available from Sybase® Corporation, Microsoft® Structured Query Language (SQL) servers, and various Open DataBase Compliant (ODBC) data sources.

As shown in FIG. 2, the host operating environment 202 is connected to the external databases 116, 122 via Oracle® database connector program 206 and DB2 database connector program 204, allowing access by the host operating environment to source table A 118 and source table B 124. The relate program 110 is utilized to identify related data from the source tables 118, 124 and to assemble relate result table 108. In the embodiment shown in FIG. 2, only the two external databases 116, 122 are shown. However, the relate program can be utilized in accordance with the invention to assemble a relate result data group such as a relate result table from more than two external data sources, including heterogeneous databases, or one or more external databases and one or more native databases, etc. The connector programs 204, 206 are intended to broadly include programs for allowing connection between the host operating environment 202 and the external databases 116, 122, and can include, in some embodiments, the systems and methods disclosed in previously incorporated by reference U.S. Pat. No. 6,003,025, and, in some embodiments, the systems and methods disclosed in previously incorporated by reference U.S. patent application Ser. Nos. 09/877,609 and 09/877,513.

Figure 3:
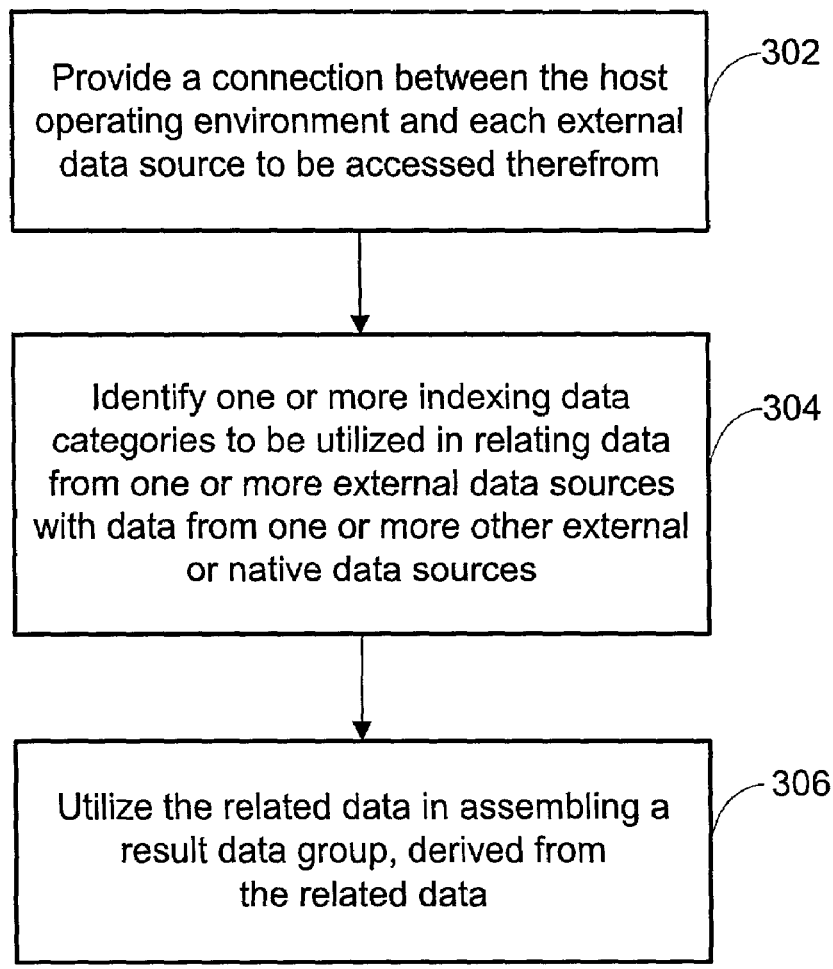
FIG. 3 is a flow chart showing a method for relating data from two or more data sources tables and assembling a result data group utilizing the related data, according to one embodiment of the invention.
Figure 4:
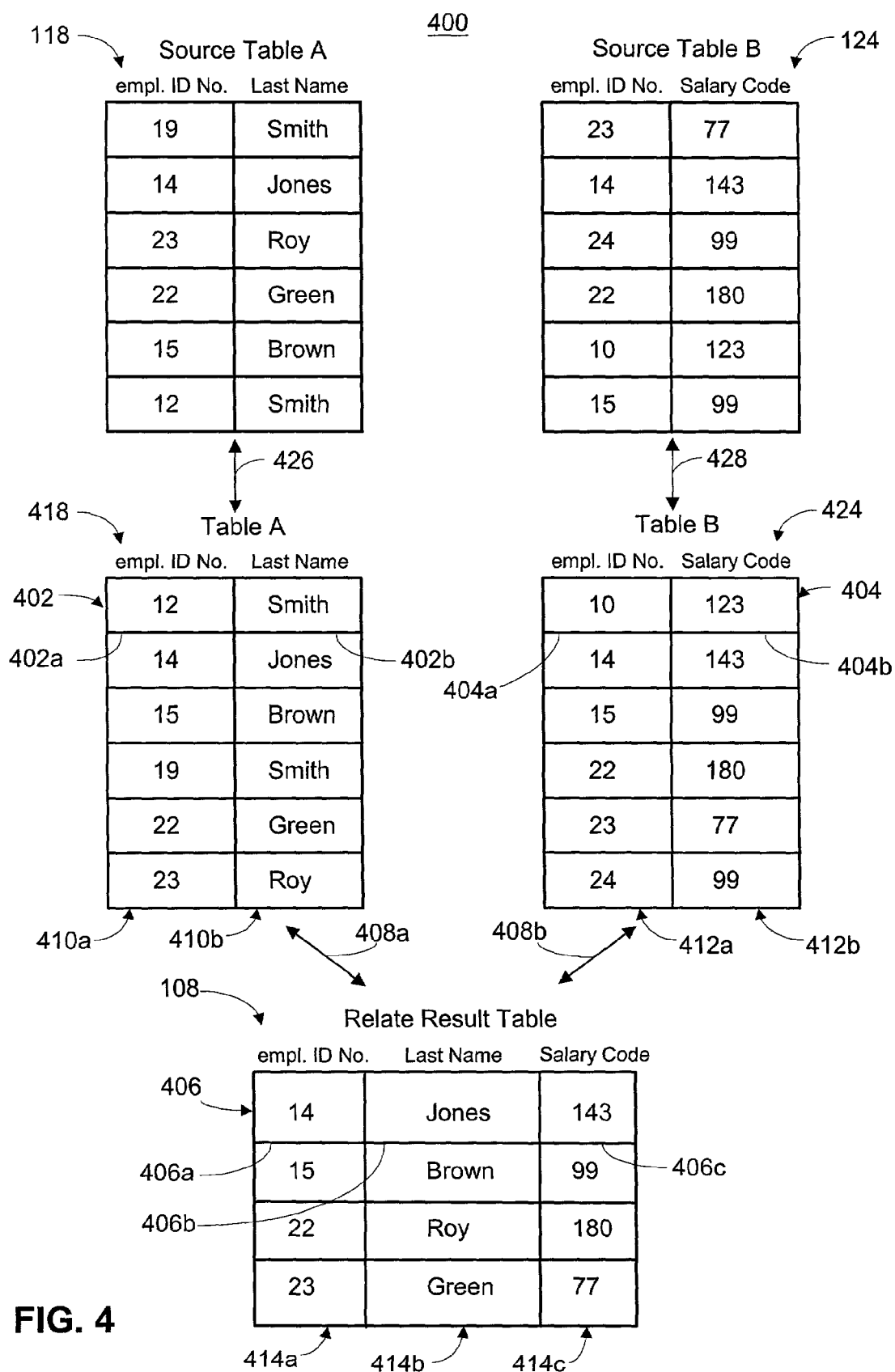
FIG. 4 depicts one embodiment of a relate result table derived from tables obtained from two source tables.
Figure 5:
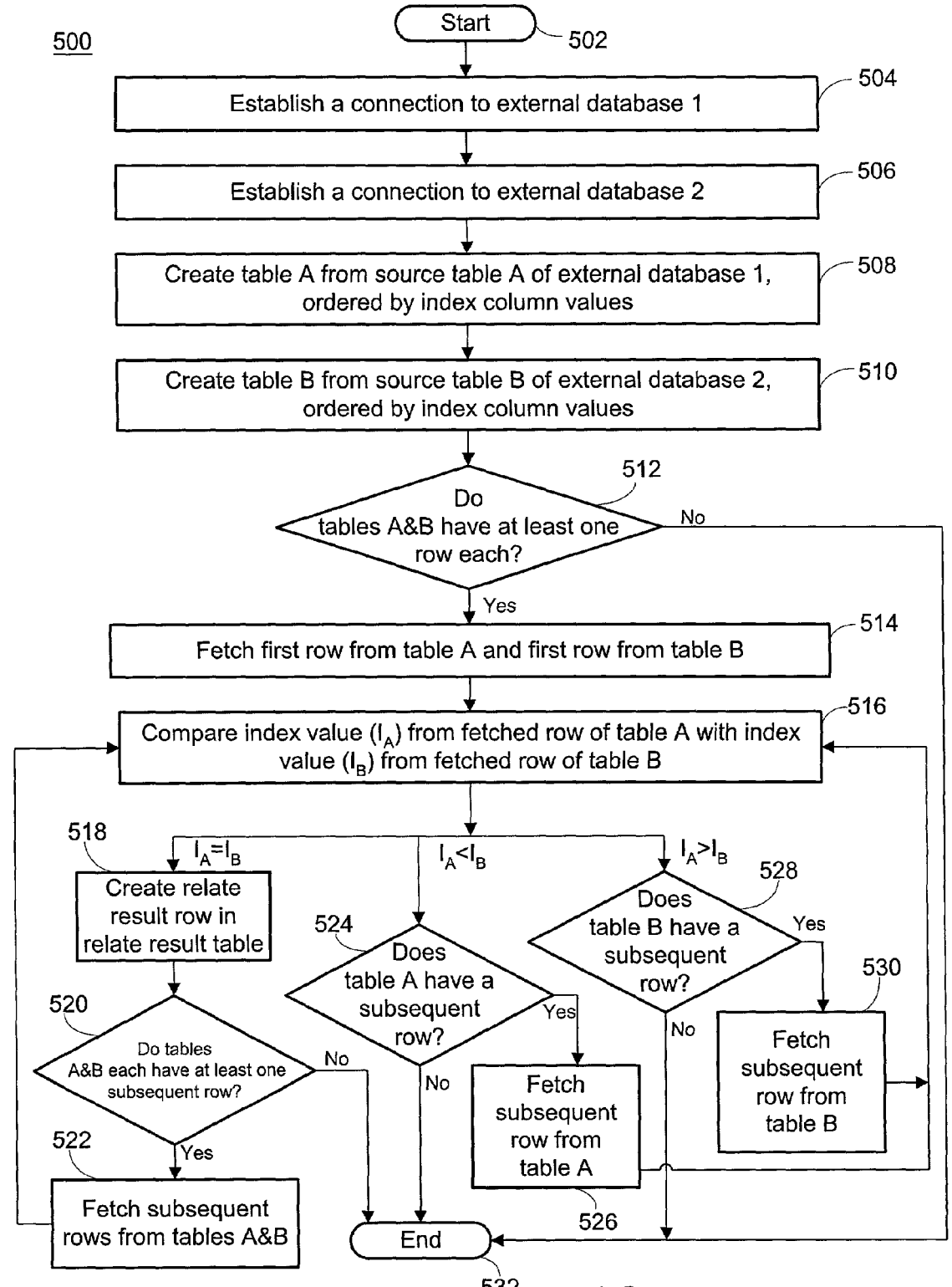
FIG. 5 is a detailed flow chart showing a method for relating data from two or more source tables and utilizing the related data in assembling a relate result table, according to one embodiment of the invention.

FIGS. 3–5 are used to describe the manner in which a relate program according to some embodiments of the invention can be utilized to identify related data from several different data organizational structures such as tables from data sources such external databases, and to assemble a result data group of data derived from the related data, such as a table including related data values.

FIG. 3 is a flow chart showing a method 300 for relating data, i.e., associating related data, from two or more data sources, including one or more external data sources, and assembling a result data group utilizing the related data, according to one embodiment of the invention. The method may be implemented by a relate program, such as the relate program 110 described above with reference to FIGS. 1 and 2. At step 302, a relate program provides a connection, as described above with reference to FIGS. 1 and 2, between a host operating environment and one or more external data sources, which external data sources are to be accessed from within the host operating environment. At step 304, the relate program identifies one or more indexing data categories, for example, columns or meta-data, to be utilized in relating data from one or more external data sources with data from one or more other external data sources or native data sources. At step 306, the relate program utilizes the related data in assembling a result data group, derived from the related data. Hence, the relate program identifies related data among the several data sources by utilizing indexing data categories, and, in one embodiment, organizes the identified related data into a result data group, such as a data table.

FIG. 4 depicts one embodiment of a relate result table 108 derived from table A 418 and table B 424, table A 418 and table B 424 being assembled from the source tables 118, 124, at least one of the source tables 118, 124 being an external data source. Source table A 118 and table A 418 each have the same columns and data, but the rows are arranged in a different order. Similarly, Source table B 124 and table B 424 each have the same columns and data, but the rows are arranged in a different order.

In the embodiment shown in FIG. 4, the employee identification number column is utilized by a relate program in identifying related data from source table A 118 and source table B 124. Source table A 118 and source table B 124 have rows that are not necessarily arranged with the employee identification numbers in any particular order. To facilitate identification of related data between the source tables, the rows of source table A 118 and of source table B 124 are not changed, but are re-arranged in table A 418 and table B 424, respectively, so that the rows are arranged such that the employee identification numbers are in ascending order. Double-headed arrows 426 and 428 represent the relate program assembling table A 418 and table B 424 from source table A 118 and source table B 124. It should be kept in mind that in embodiments of the invention where the relate result table is a virtual native document to a host operating environment, tables 418 and 424 may likewise be virtual native documents, or otherwise not saved non-volatilely in the host operating environment.

Table A 118 contains one column 410*a* containing employee identification numbers, and one column 410*b* containing employee last names associated with each employee identification number. Each row contains an employee identification number and the associated employee's last name. For example, row 402 contains the employee number, "12", as one entry 402*a*, and the associated employee last name, "Smith", as a second entry 402*b*. Source table B 118 contains one column 412*a* containing employee identification numbers, and one column 412*b* containing a salary code associated with each employee identification number. Each row contains an employee identification number and the associated employee's salary code. For example, row 404 contains the employee number, "10", as one entry 404*a*, and the associated employee salary code, "123", as a second entry 404*b*. Relate result table 108 contains one column 414*a* containing employee identification numbers, one column 414*b* containing a last name of the employee associated with each employee identification number, and one column 414*c* containing a salary code associated with each employee identification number. Each row contains an employee identification number, the associated employee's last name, and the associated employee's salary code. For example, row 406 contains the employee number, "14", as one entry 406*a*, the associated employee last name, "Jones", as a second entry 406*b*, and the associated employee salary code, "143", as a third entry 406C.

A column for employee identification numbers is thus common between the tables A 118 and B 124. Hence, rows from tables A 118 containing the same employee identification number as rows from table B 124 contain related data. Such related data is collected in the relate result table 108. Common columns, or other indexing data categories, may supplied to the relate program by a system administrator, or may be determined by the relate program, which determination is facilitated by the connection between the host operating environment and the external databases 116, 122 or other external data sources. In addition, in some embodiments of the invention, native or external data sources may be modified to add data indexing categories, such as columns, to facilitate identification of related data.

Double-headed arrows 408*a* and 408*b* represent a relate program causing the relate result table 108 to be assembled from the source tables 118, 124. In the example shown in FIG. 4, the employee identification number is used as an index column. A relate program within a host operating environment connected to the source tables 118, 124 utilizes the employee identification number entries of the source tables 118, 124 to relate associated data from the two source tables 118, 124. The relate program then assembles a relate result table therefrom. In some embodiments of the invention, the relate result table can take the form of a virtual native document.

In the embodiment depicted in FIG. 4, a single index column in common between the source tables is utilized to associate related data. However, in more complex embodiments, combinations of multiple index columns can be utilized, each column being in common between at least two of the source tables. In some embodiments, the relate program can utilize algorythms or software, such as data mining software, to identify indexing data categories, or to identify related data utilizing combinations of indexing data categories. Examples of the data mining software that can be utilized by some embodiments of the relate program include the INTELLIGENT MINER software, including the IBM DB2 INTELLIGENT MINER FOR DATA, available from International Business Machines, the MINESET™ software available from SGI™, and various data mining software available from SPSS®.

In the embodiment depicted in FIG. 4, the relate result table 108 is the product of a "simple join" operation. However, as known in the art, many different types of "joins", or ways to organize related data, are possible, including inner joins, outer joins, left joins, right joins, etc. Even more complex relate result tables are possible that are assembled from related data which is first operated on or otherwise manipulated, so that the entries in the relate result table are derived from, but different from, entries of the source tables. Still Further, the relate result table could be assembled from a specified subset of entries only, such as only containing related data pertaining to employees with an employee number less than 50. The relate program can be used to implement these various programming possibilities and to produce the various possible relate result tables.

FIG. 5 is a detailed flow chart showing a method 500 for relating data from two or more source tables and utilizing the related data in assembling a relate result table, according to one embodiment of the invention, which method 500 can be implemented using a relate program. The method 500 begins at step 502. At steps 504 and 506, the relate program establishes a connection to a first external database and a second external database, respectively.

At steps 508 and 510, the relate program creates tables A and B from source tables A and B, ordered by index column values. That is, it is assumed that one index column is utilized, and that it is shared by both source tables A and B. Tables A and B are then formed by ordering or organizing the rows of source tables A and B in ascending order, to facilitate identification of related data, as explained further as follows.

At step 512 the relate program queries whether tables have at least one row each, i.e., the relate program verifies that each table actually contains data. If not, then obviously there can be no related data between the tables, and so the method 500 ends at step 532, without assembling any relate result table. If the tables A and B each contain at least one row, the relate program, at step 514, fetches the first row of each table A and B, which, for example, can include introducing the data, even if only virtually, into the host operating environment.

Next, at step 516, the relate program compares the index column values in each of the two fetched rows of the tables A and B. If the index column values are identical, then the rows contain related data. Therefore, if the index values are identical, at step 518, the relate program creates a row in a relate result table, for example, to contain the related data, as depicted in relate result table 108 of FIG. 4. Having assembled a row of the relate result table, the relate program next queries, at step 520, whether the tables A and B each have at least one subsequent row to the row last fetched. If not, the method 500 ends at step 532, there being no more related data between the result tables. If, however, there is at least one subsequent row in each of the tables A and B, then the relate program proceeds to step 522, where it fetches the next row from each of the tables A and B, and then proceeds back to step 516 to compare the index values of these last fetched rows.

If, at step 516, the index value for table A is less than the index value for table B, then the relate program queries, at step 524 whether table A contains a subsequent row. If so, the relate program, at step 526, fetches that subsequent row and then returns to step 516, to compare this newly fetched row from table A with the last fetched row from table B. If not, then the method 500 ends at step 532, there being no more related data between the tables A and B.

If at step 516, the index value for table A is greater than the index value for table B, then the relate program queries, at step 528, whether table B contains a subsequent row. If so, the relate program, at step 530, fetches that subsequent row and then returns to step 516, to compare this newly fetched row from table B with the last fetched row from table A. If not, then the method 500 ends at step 532, there being no more related data between the result tables.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

The invention claimed is:

1. A computer program usable medium storing program code which, when executed on a computerized device, causes the computerized device to execute a method for assembling, from within a host system operating environment, a result data group derived from related data from two or more data sources, one or more of the two or more data sources being an external data source to the host operating environment the, method comprising:
    providing a connection between the host operating environment and the one or more external data sources, through which external data is made available within the host operating environment;
    identifying one or more indexing data categories for determining relationship between data from each of the two or more data sources, each of the one or more indexing data categories being utilized in at least two of the two or more data source categorize data;
    utilizing data from the a least tow of the two or more data sources and categorized under at least one of the one or more indexing categories, identifying related data from at least tow of the two or more data sources; and
    utilizing the related data, assembling the result data group derived from the related data;
    wherein the method allows one or more client computers to access and manipulate data from the result data group through the host environment as a first class participant without requiring nonvolatile storage of external data as native data to the host environment.

2. The computer usable medium of claim 1, wherein assembling the result data group comprises assembling a virtual native result data document within the host operating environment.

3. The computer usable medium of claim 1, wherein the method comprises assembling a second set of data sources from the data sources, the second set of data sources being derived from the data sources and organized according to data entries associated with the data indexing categories, and the second set of data sources being utilized in the identifying of the related data.

4. The computer usable medium of claim 3, wherein the method comprises allowing use of data from the virtual native result data document as a first class participant in the host operating environment.

5. The computer usable medium of claim 4, wherein the method comprises, if data from the virtual native result data document is changed through the host operating environment, performing any appropriate updating of external data in the one or more external data sources.

6. The computer usable medium of claim 1, wherein the data from the two or more data sources is organized into tables comprising rows of data, and wherein the one or more indexing data categories comprise one or more indexing columns of the tables, and wherein identifying one or more indexing data categories for determining relationship between data from each of the two or more data sources comprises identifying the one or more indexing columns for determining relationship between two or more of the rows of data.

7. The computer usable medium of claim 1, wherein assembling the result data group derived from the related data comprises assembling a result table comprising data derived from at least two of the two or more data sources.

8. The computer usable medium of claim 7, wherein assembling the result table comprising data derived from at least two of the two or more data sources comprises assembling a result table comprising data values from at least two of the two or more data sources.

9. The computer usable medium of claim 8, wherein assembling the result table comprising data values from at least two of the two or more data sources comprises concatenating data values from related rows of at least two of the two or more data sources to form rows of the result data table.

10. The computer usable medium of claim 9, wherein the method comprises allowing one or more client computers to access and manipulate data from the result data table through the host operating environment as a first class participant without requiring nonvolatile storage of external data as native data to the host operating environment.

11. The computer usable medium of claim 10, wherein assembling the result data table comprises assembling a virtual native result data document within the host operating environment.

12. The computer usable medium of claim 1, wherein at least one of the one or more external data sources comprises a relational database system.

13. The computer usable medium of claim 12, wherein at least one of the one or more external databases comprises an Open DataBase Compliant (ODBC) data source.

14. The computer usable medium of claim 2, wherein the method comprises providing the host operating environment utilizing a Lotus® Domino™ server computer.

15. The computer usable medium of claim 2, wherein at least one of the one or more external data sources comprises an Oracle® relational database system.

16. The computer usable medium of claim 2, wherein at least one of the one or more external data sources comprises an DB2 relational database system.

17. A method for identifying, from within a host operating environment, related data from two or more data source being an external data source to the host operating environment, the method comprising:
providing a connection between the host operating environment and each of the one or more external data sources, though which external data is made available within the host operating environment;
identifying one or more indexing data categories for determining relationship between data form each of the two or more data sources, each of the one or more indexing data categories being utilized in at least two of the two or more data sources to categorize data; and
utilizing data from at lest two of the two or more data sources and categorized under at least one of the one or more indexing data categories, identifying related data from at least two of the two or more data sources; and
utilizing the related data, assembling a result data group derived from the related data;
wherein the allowing allows one or more client computers to access and manipulate data from the result data group through the host operating environment as a first class participant without requiring nonvolatile storage of external data as native data to the host operating environment.

18. The method of claim 17, wherein the data from the two or more data sources is organized into tables comprising rows of data, and wherein the one or more indexing data categories comprise one or more indexing columns of the tables, and wherein identifying one or more indexing data categories for determining relationship between data from each of the two or more data sources comprises identifying the one or more indexing columns for determining relationship between two or more of the rows of data.

19. The method of claim 18, comprising assembling a second set of data sources from the data sources, the second set of data sources being derived from the data sources and organized according to data entries associated with the data indexing categories, and the second set of data sources being utilized in the identifying of the related data.

20. A method for assembling, from within a host operating environment, a virtual native result document within the host operating environment derived from related data from two or more data sources, one or more of the two or more data sources being an external data source to the host operating environment, the method comprising:
providing a connection between the host operating environment and the one or more external data sources, through which external data is made available within the host operating environment;
identifying one or more indexing data categories for determining relationship between data from each of the two or more data sources, each of the one or more indexing data categories being utilized in at least two of the two or more data sources to categorize data;
utilizing data from at least two of the two or more data sources and categorized under at least one of the one or more indexing data categories, identifying related data from at least two of the two or more data sources;
utilizing the related data, assembling the virtual native result document derived from the related data, wherein one or more client computers may access and manipulate data from the virtual result document as first class data through the host operating environment without requiring nonvolatile storage of external data as native data to the host operating environment.

21. A system for assembling, from within a host operating environment, a result data group derived from related data from two or more data sources, at least one of the two or more data sources being an external data source to the host operating environment, the system comprising:
a server computer which facilitates providing the host operating environment;
at least one data source that is external to the host operating environment;
a connection program, capable of being executed within the host operating environment, for providing a connection between the host operating environment and the at least one external data source, through which connection external data is made available within the host operating environment; and
a relate program, capable of being executed within the host operating environment, for:
identifying one or more indexing data categories for determining relationship between data from each of the two or more data sources, each of the one or more indexing data categories being utilized in at least two of the two or more data sources to categorize data;
utilizing data from at least two of the two or more data sources and categorized under at least one of the one or more indexing data categories, identifying related data from at least two of the two or more data sources; and
utilizing the related data, assembling the result data group derived from the related data; and
allowing one or more client computers to access and manipulate data from the result data group through the host operating environment as a first class participant without requiring nonvolatile storage of external data as native data to the host operating environment.

22. The system of claim 21, wherein assembling the result data group comprises assembling a virtual native result data document within the host operating environment.

23. A system for assembling, from within a host operating environment, a result data group derived from related data from two or more data sources, at least one of the two or more data sources being an external data source to the host operating environment, the system comprising:
means for providing a connection between the host operating environment and each of the one or more external data sources, though which external data is made available within the host operating environment;
means for identifying one or more indexing data categories for determining relationship between data from each of the two or more data sources, each of the one or more indexing data categories being utilized in at least two of the two or more data sources to categorize data;
means for utilizing data from at least two of the two or more data sources and categorized under at least one of the one or more indexing data categories, identifying related data from at least two of the two or more data sources;
means for, utilizing the related data, assembling the result data group derived from the related data; and
means for allowing one or more client computers to access and manipulate data from the result data group through the host operating environment as a first class participant without requiring nonvolatile storage of external data as native data to the host operating environment.

24. The system of claim 23, wherein the means for assembling the result data group comprises means for assembling a virtual native result data document within the host operating environment.

* * * * *